(12) United States Patent
Doust

(10) Patent No.: US 6,354,565 B1
(45) Date of Patent: Mar. 12, 2002

(54) WASHER ASSEMBLY FOR A FAUCET

(76) Inventor: Phillip George Doust, P.O. Box 19, North Beach, Western Australia 6020 (AT)

(*) Notice: Subject to any disclaimer, the term of this patent is extended or adjusted under 35 U.S.C. 154(b) by 0 days.

(21) Appl. No.: 09/417,476

(22) Filed: Oct. 13, 1999

Related U.S. Application Data

(63) Continuation-in-part of application No. 09/017,729, filed on Feb. 3, 1998, now Pat. No. 5,984,268.

(30) Foreign Application Priority Data

Feb. 4, 1997 (AU) ............................................. P04949
Mar. 25, 1997 (AU) ............................................. P05860

(51) Int. Cl.$^7$ ............................................. F16K 51/00
(52) U.S. Cl. ............................................. 251/175; 251/332
(58) Field of Search ............................................. 251/175, 332, 251/333, 334, 215–224, 264–271, 273, 274

(56) References Cited

U.S. PATENT DOCUMENTS

| | | | |
|---|---|---|---|
| 75,376 A | * 3/1868 | Cooper | 251/266 X |
| 267,733 A | * 11/1882 | Whittaker | 251/271 |
| 281,394 A | * 7/1883 | Phillips | 251/266 X |
| 324,676 A | * 8/1885 | Frisbie | 251/274 X |
| 406,979 A | * 7/1889 | Wallace | 4/652 |
| 508,486 A | * 11/1893 | Murphy | 251/270 |
| 574,768 A | * 1/1897 | Walsh, Jr. | 251/216 X |
| 763,208 A | * 6/1904 | Robinson | 251/175 |
| 1,587,080 A | * 6/1926 | Marcelli | 251/220 |
| 2,021,969 A | * 11/1935 | Snodgrass | 251/216 |
| 2,311,009 A | * 2/1943 | Urquhart | 251/332 |
| 2,414,908 A | * 1/1947 | Smith | 251/333 |
| 2,593,740 A | * 4/1952 | Faust | 251/332 X |
| 2,610,021 A | * 9/1952 | Smith | 251/332 |
| 2,844,353 A | 7/1958 | Gurries | |
| 3,043,554 A | 7/1962 | De La Garza | |
| 3,103,948 A | 9/1963 | Salmen | |
| 3,347,519 A | * 10/1967 | Engstrom | 251/365 |
| 3,386,700 A | * 6/1968 | Greene et al. | 251/175 |
| 3,511,475 A | * 5/1970 | Pfau | 251/333 |
| 3,658,291 A | * 4/1972 | Meges | 251/266 |
| 4,064,904 A | 12/1977 | Tolnai | |
| 4,172,585 A | * 10/1979 | Rolfe | 251/175 X |
| 4,889,162 A | 12/1989 | Newcombe et al. | |

FOREIGN PATENT DOCUMENTS

| | | |
|---|---|---|
| AU | 65723/65 | 4/1967 |
| AU | 30643/67 | 6/1970 |
| GB | 1164678 | 9/1969 |
| GB | 1184658 | 3/1970 |

* cited by examiner

*Primary Examiner*—John Kwon
*Assistant Examiner*—Eric Keasel

(57) ABSTRACT

A washer assembly 30 includes a resilient sealing member 44 having a cylindrical wall 48 with a first axial end 49 and an opposite second axial end 51. A wall 50 extends radially inward from first axial end 51. The member 44 is seated in a housing 46 having a base 54 and skirt 56 extending axially from the base. The skit 56 extends axially beyond the second axial end 51 of the member 44 and terminates in an annular surface 53 having an inner diameter which is substantially co-terminus with an outer diameter of the second axial end 51.

11 Claims, 1 Drawing Sheet

WASHER ASSEMBLY FOR A FAUCET

CROSS REFERENCE TO RELATED APPLICATION

This application is a continuation in part of U.S patent application Ser. No. 09/017,729 (entitled "A Sealing Member and a Valve Closure Member Incorporating the Same", filed Feb. 3, 1998 now U.S. Pat. No. 5,984,268; hereinafter referred to as the parent application). The disclosure of the foregoing patent application is incorporated herein by reference in its entirety.

BACKGROUND OF THE INVENTION

The parent application deals with sealing members and valve closure members for taps commonly available in Australia. Such taps consist of a tap head threadingly connected to a tap body, the tap body including a water passageway having a fluid inlet, a fluid outlet, and a washer seat therebetween. A spindle is threadingly retained within the head so that rotation of the spindle in opposite directions moves it up and down within the tap body. The prior art washer assembly comprises a resilient disc fixed to a metal alloy or rigid plastic backing plate with an integral pin extending upwardly from the centre of the backing plate. The pin of the washer assembly is received within a hole formed axially in the lower end of the spindle located within the tap body. By turning the spindle in a first direction the washer assembly can be pushed down onto the seat to close the tap. By turning the spindle in the opposite direction, the wash assembly is lifted largely by water pressure to open the tap. The quality of the seal in the tap is dependent on both the form of the washer assembly and the seat. In the typical Australian tap, the tap body is formed by casting and as such, the seat has the normal imperfections associated with casting, namely relatively rough, and sometimes unlevel, surface. In order to compensate for these imperfections in the seat, the parent application discloses a sealing member and valve closure member incorporating the sealing member with improved sealing capabilities. In general terms the sealing member is in the form of a resilient bladder that is inflated by the pressure of the water to assist in sealing against the seat.

However, faucets typically available in the USA and Asia are of different construction. Specifically, the washer assembly typically is in the form of a disc of resilient material as fastened by a screw to the end of the spindle. In this way, the washer turns with the spindle. In contrast, with the Australian style tap, the washer is simply retained by the spindle and does not necessarily rotate with the spindle. Reasonably good sealing is provided in the US style faucet by virtue of having a closely toleranced insert that separately machined and placed within the faucet body to form the washer seat. The insert is substantially cylindrical in form and has, at an upper end, a radially extending flange used to support the insert within the faucet body and radially inward thereof, an upwardly extending spigot. The spigot is formed with smoothly curved upper surface. The washer in the faucet pushes against the curved surface of the spigot when closing the tap.

A fundamental problem however remains with the US style faucet that because the washer turns with the spindle it is subject to excessive wear and tear. This is because substantially all of the downwards pressure applied by turning the spindle is transmitted by the resilient washer onto the insert. The harder one turns the spindle the greater the compression and fictional forces on the washer. If the washer suffers a catastrophic failure, e.g. tears aware from the spindle, the faucet is likely to leak with a relatively high flowrate.

SUMMARY OF THE INVENTION

It is an object of the present invention to provide an alternate form of washer assembly particularly suited to the US style faucet.

According to the present invention there is provided a washer assembly for a faucet the washer assembly comprising:

a resilient sealing member and a rigid housing that houses the resilient sealing member, the resilient sealing member having a cylindrical wall with opposite first and second axial ends and a first wall extending across the first axial end forming with said cylindrical wall a cavity into which fluid can enter from the second axial end;

the housing having a base and a skirt depending from the base with the inside of the housing having a shape complimentary to the outside shape of the resilient sealing member, the housing and the resilient sealing member relatively dimensioned so that the skirt extends axially beyond the second axial end of the cylindrical wall. Preferably the resilient sealing member is provided with a lip or membrane extending radially inward across the second axial end to an aperture through which the fluid can flow to enter the cavity, the lip or membrane creating, together with the cylindrical wall and the first wall, a rebate in the sealing member in which fluid pressure can act to tend to deform the lip and adjacent portions of the resilient sealing member outward from the cavity.

Preferably the base and the first wall are each formed with an axial hole, said holes being in mutual alignment and through which a fastener can pass for fixing the washer assembly to a spindle of the faucet.

Preferably the inside of the base is formed with a protruding ridge around the hole formed therethrough, and the first wall has a reduced thickness portion that covers the ridge, the fastener clamping the reduced thickness portion to the ridge when it fixes the washer assembly to the spindle.

BRIEF DESCRIPTION OF THE DRAWINGS

An embodiment of the present invention will now be described by way of example only with reference to the accompanying drawings in which.

DESCRIPTION OF THE PREFERRED EMBODIMENTS

Figure 1:
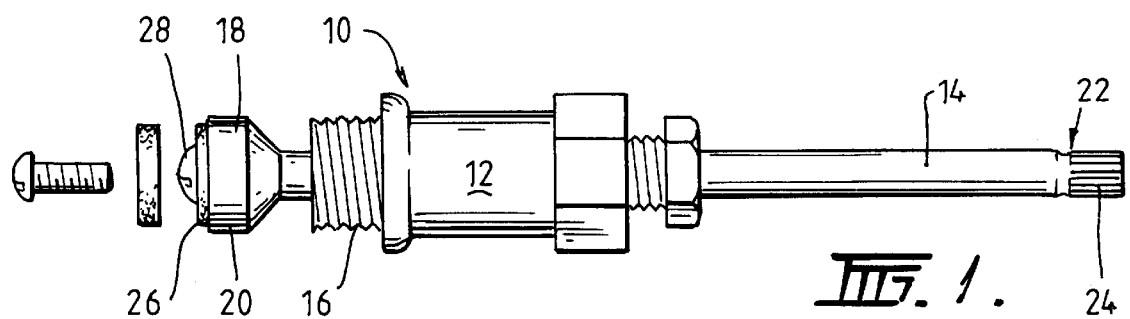
FIG. 1 is a schematic representation of the stem of a faucet incorporating a prior art washer.

As shown in FIG. 1, the stem 10 of a faucet (not shown) comprises an outer body 12 and an axially extending spindle 14. A lower end 16 of the outer body 12 is formed with an outer thread for screwing into the faucet body (not shown). First end 18 of the spindle 14 nearest the lower end. 16 is formed with an increased diameter head 20. Second opposite end 22 of the spindle 14 is formed with a plurality of circumferentially spaced longitudinally extending ribs 24. A disc type washer 26 is attached to the head 20 by way of a screw 28. A handle (not shown) engages the ribs 24 at the second end 22 to facilitate manual rotation of the spindle 14 in clockwise or anticlockwise directions to allow opening and closing of the faucet.

Figure 2:
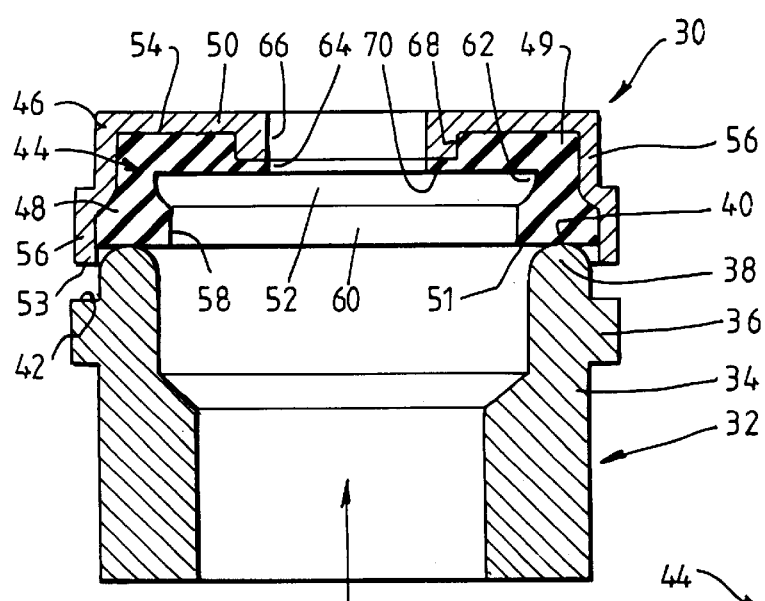
FIG. 2 is a section drawing of a first embodiment of the present invention at the time of initial contact with an insert of a faucet.
Figure 4:
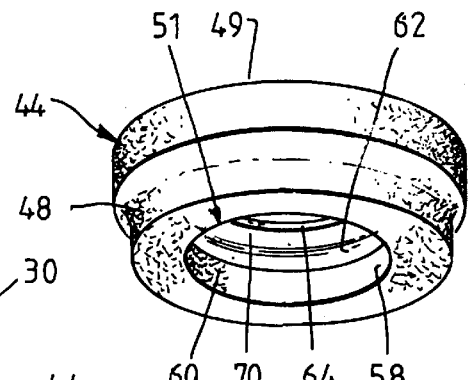

FIG. 2 illustrates an embodiment of the washer assembly 30 in accordance with the present invention together with a typical faucet insert 32. The insert 32 is in the form of a short cylindrical tube 34 with a radially outward extending flange 36 formed about the outer circumference near an upper end of the tube 34. Extending axially upward from the flange 36 is a spigot 38 having a smoothly curved or radiused upper surface 40. A shoulder 42 is formed about the outer circumference of the tube 34 between the flange 36 and spigot 38.

To turn OFF a faucet using the prior art washer 26, the spindle 14 is turned in a clockwise direction to press the washer 26 onto the upper surface 40 of spigot 38. When there is full contact between the surface of the washer 26 and the upper surface 40, a seal is formed preventing water from passing through a central passage in the insert 32 thus turning the faucet OFF. If one to continues to turn the spindle 14 further in a clockwise direction; the washer 26 is pushed harder against the spigot 38 further compressing the washer 26, and in particular an annulus of the washer 26, between the spigot 38 and the head 20. Assuming that the washer 26 does not tear or otherwise fail, the limiting factor on the closing force of the faucet is the compressibility of the washer 26. That is, the clockwise rotation of the spindle 14 for closing the faucet is stopped when the person turning the spindle 14 cannot compress the washer 26 any further. This of course may vary from person to person depending on their physical strength.

Figure 3:
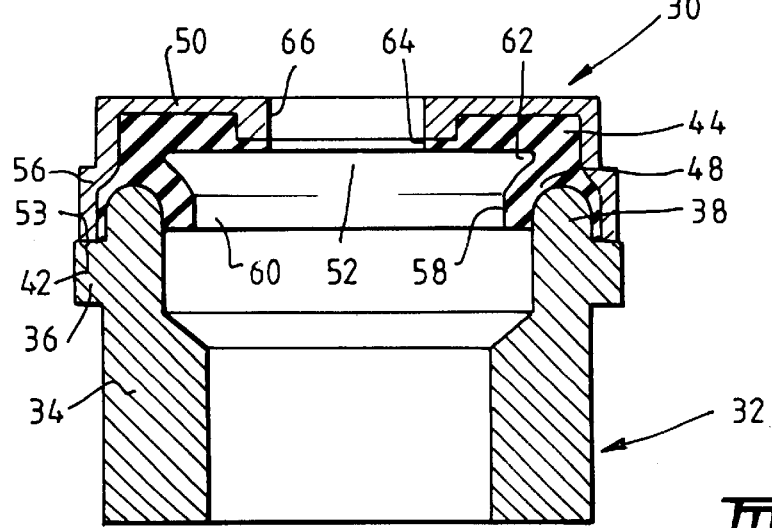
FIG. 3 is a cross sectional view depicting the washer assembly at full sealing contact with the insert; and, FIG. 4 is an isometric view of a sealing member incorporated in the washer assembly.

A washer assembly 30 in accordance with an embodiment of this invention comprises a resilient sealing member 44 and a rigid housing 46 that houses the resilient sealing member 44. The resilient sealing member 44 has a cylindrical wall 48 with first axial end 49 opposite second axial end 51 and a first wall 50 extending radially inward from the first axial end 51 forming, with the cylindrical wall 48, a cavity 52 into which fluid can enter from the second axial end. The housing 46 has a base 54 and a skirt 56 extending axially from the base to define a seat. The inside shape of the housing 46 (i.e., the shape of the seat) is complimentary to the outside shape of the resilient sealing member 44. The skirt 56 extends axially beyond the second axial end 51 of cylindrical wall 48 and terminates in an annular surface 53 having and inner diameter which is substantially coterminous with an outer diameter of the second axial end 51 of the member 44. As shown in FIG. 3, the skirt 56 abuts with the flange 36 and seats in the shoulder 42 when the washer assembly 30 is forced or pushed to its maximum extent onto the insert 32, corresponding to the fully OFF or closed condition of the faucet.

The resilient sealing member 44 includes a lip or membrane 58 that extends radially inward across the second axial 51 end to an aperture 60 through which fluid can enter the cavity 52. The lip or membrane 58 together with first wall 50 and cylindrical wall 48 in effect create a circumferential rebate 62 on the inside of the sealing member 44. The rebate 62 has two effects. Firstly, its provides a region in which fluid pressure can act to tend to deform the lip (or membrane) 58 and adjacent portions of the resilient sealing member 54 outward from the cavity 52. In this way, the pressure of the fluid itself assists in the formation of a seal and the closing process by forcing the lip 58 and adjacent portions of the resilient sealing member against the spigot 38. A further effect of the rebate 62 is that it allows a degree of deflection of the lid 58 and cylindrical wall 48 diagonally inward tending to reduce the size of the rebate 62 as the washer assembly is pushed harder against the insert 32. This has the benefit of providing some give to the resilient sealing member 44 in addition to that provided by its natural resilient.

Both the first wall 50 and the base 54 are formed with respective axial holes 64 and 66 arranged in mutual alignment. When the washer assembly 30 is used with the stem 10, screw 28 passes through the holes 64,66 to fasten the washer assembly 30 to the head 20 of spindle 14.

The inside of the base 54 is formed with a protruding ridge 68 around the hole 66. Further, the first wall 50 has a portion 70 of reduced thickness that covers the ridge 48. When the screw 28 fastens the washer assembly 30 to the spindle 14, the head of the screw 28 clamps the portion 70 to the ridge 68. This assists in holding the resilient sealing member 44 in the housing 46. However the resilient sealing member 44 is primarily held within the housing 46 by relative dimensioning of those components to form an interference fit.

The operation of the washer assembly 30 will now be described. The washer assembly 30 is retrofitted to the stem 10 by unscrewing the screw 28, removing the conventional prior art disc washer 26, passing the shank of the screw 28 through the holes 64 and 66 and then screwing the screw 28 back into the head 20 of spindle 14. Assume that the faucet is ON so that water is flowing upwardly through the insert 32. To turn OFF the faucet, the spindle 14 is rotated in the clockwise direction. This causes the spindle 14 to move axially in a downward direction advancing the washer assembly 30 toward the insert 32. As this advancement continues, the second axial end (or the lip or membrane, when incorporated) of the resilient sealing member initially contacts the upper surface 40 of the spigot 38. This constitutes an initial OFF point for the faucet. Depending on the fluid pressure however, some fluid may still drip on the faucet. To fully turn OFF the faucet, the spindle 14 is further turned in the clockwise direction. Consequently, the resilient sealing member is compressed by the spigot 38. Additionally, the lip 58 and adjacent portions of the resilient sealing member may deflect diagonally inward in a manner so as to squash the rebate 42. Simultaneously, fluid pressure within the cavity 52 and acting within the rebate 62 will have a counter effect tending to push the lid 58 against the spigot 48. Thus, the sealing effect is aided by the water pressure acting Within the resilient sealing member 44. Eventually as one continues to rotate the spindle 14 in the clockwise direction, the skirt 56 and more particularly the annular surface 53 thereof contacts the flange 36 seating in the shoulder 42. This constitutes the axial limit to the downward motion of the pressure assembly 30. If one attempts to further turn the spindle 14 in the clockwise direction additional force is applied to the housing 46 to protect the resilient sealing means from excessive shearing/tearing forces. It is envisaged that the housing would be made from a plastics material such as ACETAL. However alternately, the housing 46 may be made from a metal or alloy including, but not limited to, brass. The resilient sealing member 44 is advantageously made from a rubber material and preferably a rubber material having a hardness on the Shore scale in the order of 60 to 100. One particularly well suited material is SANTOPRENE.

All modifications and variations of the above disclosed embodiment as would be apparent to those of relevant skill in the relevant arts are considered to be within the scope of the present invention that nature of which is to be determined from the above description and the following claims.

What is claimed is:

1. A washer assembly for a faucet comprising:
   a resilient sealing member having a cylindrical wall with opposite first and second axial ends and a first wall extending in a radially inward direction from said first axial end, wherein said first wall and said cylindrical wall form a cavity into which fluid can enter from said second axial end during operation of said washer assembly with said faucet; and,
   a housing having a base and a skirt extending axially from said base to define a seat in which said resilient sealing member is retained, said skirt extending axially beyond said second axial end of said cylindrical wall and terminating in an annular surface having an inner diameter dimensioned to be substantially radially coterminous with an outer diameter of said second axial end when said resilient sealing member is retained in said seat.

2. The washer assembly according to claim 1, wherein said seat has an interior surface of a shape complimentary to an outside surface of said resilient sealing member with an outer circumferential surface of said cylindrical wall abutting said interior surface of said seat.

3. The washer assembly according to claim 2, wherein said resilient sealing member is provided with a lip extending radially inward from said second axial end to an aperture through which fluid can enter said cavity, said lip creating, together with said cylindrical wall and said first wall, a rebate in said sealing member to accommodate axial compression of said cylindrical wall as well as fluid pressure acting to urge outward deformation of said lip.

4. The washer assembly according to claim 3, wherein said base and said first wall are each provided with an axial hole through which a fastener can pass for fixing said washer assembly to a spindle of said faucet.

5. The washer assembly according to claim 4, wherein the inside of said base is formed with an axially protruding ridge around the hole formed therethrough, and said first wall has a reduced thickness portion that covers said ridge.

6. A faucet comprising:
   a washer assembly including a resilient sealing member and a housing;
   wherein said resilient sealing member includes a cylindrical wall with opposite first and second axial ends, a first wall extending in a radially inward direction from said first axial end and said first wall and said cylindrical wall form a cavity into which fluid can enter from said second axial end during operation of said washer assembly with said faucet, and said housing includes a base and a skirt extending axially from said base to define a first seat in which said resilient sealing member is retained, said skirt extending axially beyond said second axial end of said cylindrical wall and terminating in an annular surface having an inner diameter dimensioned to be substantially radially coterminous with an outer diameter of said second axial end when said resilient sealing member is retained in said first seat;
   a spindle to which said washer assembly is coupled; and,
   an insert forming a second seat for said washer assembly, said insert provided with an annular flange and a spigot extending axially from said flange, said spigot having an outer diameter smaller than said inner diameter of said annular surface, wherein said faucet is in a fully closed position when said washer assembly is advanced by said spindle linearly towards said insert to a position where said spigot abuts said second axial end of said cylindrical wall and said annular surface of said skirt abuts said flange.

7. The faucet of claim 6, wherein said first seat has an interior surface of a shape complimentary to an outside surface of said resilient sealing member with an outer circumferential surface of said cylindrical wall abutting said interior surface of said first seat.

8. The faucet of claim 7, wherein said resilient sealing member is provided with a lip extending radially inward from said second axial end to an aperture through which fluid can enter said cavity, said lip creating, together with said cylindrical wall and said first wall, a rebate in said sealing member to accommodate axial compression of said cylindrical wall as well as fluid pressure acting to urge outward deformation of said lip.

9. The faucet of claim 8, wherein said base and said first wall are each provided with an axial hole through which a fastener can pass for fixing said washer assembly to said spindle of said faucet.

10. The faucet of claim 9, wherein the inside of said base is formed with an axially protruding ridge around the hole formed therethrough, and said first wall has a reduced thickness portion that covers said ridge.

11. A washer assembly for a faucet comprising:
    a resilient sealing member having a cylindrical wall with opposite first and second axial ends and a first wall extending in a radially inward direction from said first axial end, wherein said first wall and said cylindrical wall form a cavity into which fluid can enter from said second axial end during operation of said washer assembly with said faucet; and,
    a housing having abase and a skirt extending axially from said base to define a seat in which said resilient sealing member is retained, said skirt extending axially beyond said second axial end of said cylindrical wall and terminating in an annular surface having an inner diameter of substantially the same dimension as an outer diameter of said second axial end such that an outer circumferential surface of said second axial end remains adjacent said annular surface when said resilient sealing member is retained in said seat.

* * * * *